DELAY CORRELATION RADIOMETER

Filed April 22, 1968

INVENTOR
JOHN P. BEYER

BY

Sughrue, Rothwell, Mion, Zinn & Macpeak
ATTORNEYS

United States Patent Office 3,544,900
Patented Dec. 1, 1970

3,544,900
DELAY CORRELATION RADIOMETER
John P. Beyer, Rockville, Md., assignor to Communications Satellite Corporation, Washington, D.C.
Filed Apr. 22, 1968, Ser. No. 723,113
Int. Cl. H04b *1/16*
U.S. Cl. 325—363 6 Claims

ABSTRACT OF THE DISCLOSURE

A radiometer receiver system for the elimination or reduction of receiver noise through the use of delay correlation. The input signal is divided into two components. One of the components is time delayed and summed with the other component at the input to an input amplifier stage of the receiver. At the output of the receiver, the signal is again divided into two components, one of which is time delayed an amount equal to the input time delay. The delayed output component is correlated with the other output component to produce a response proportional only to the input signal without amplifier noise.

BACKGROUND OF THE INVENTION

Thermal radiometers are used to measure thermal power flux such as the radiation from a radio star or from a hot resistor. Radiometers can be used to measure any thermal (or random) incoming radio power, hereafter called the thermal signal. When measuring the power from a radio star, for example, the inherent noise of the receiver system, hereafter called the thermal noise, is a severely limiting factor. The thermal signal mixes with the inherent and much larger receiver thermal noise and, since both thermal signal and thermal noise are random it is quite difficult to distinguish between the two.

Pevious radiometers have used two receiver-amplification channels in a correlation technique to extract the thermal signal. According to that technique the very low power thermal signal is divided into two components, each of which is amplified by a different one of the receivers. Assuming that the receivers are independent and result in different inherent thermal noise being added to the thermal signal components, the inherent thermal noise can be substantially eliminated by correlating the receiver outputs. The integral of the square of the thermal signal component is dependent upon the thermal radiation received whereas the product of the independent inherent thermal noise signals, integrated over a long enough period, reduces to zero.

SUMMARY

This invention is an improvement over the prior radiometer systems because only one receiver amplification channel is needed, while the invention still has the advantages of the removal of receiver thermal noise by correlation. This improvement is accomplished by delaying one component of the input thermal signal a predetermined amount before applying the input thermal signal to the receiver. The receiver output then contains the thermal signal, a delayed thermal signal, and the inherent thermal noise of the receiver. A correlation process, again using the predetermined delay, is used to remove the inherent thermal noise and to poduce an integral square thermal signal.

DESCRIPTION OF THE PREFERRED EMBODIMENT

Figure 1:
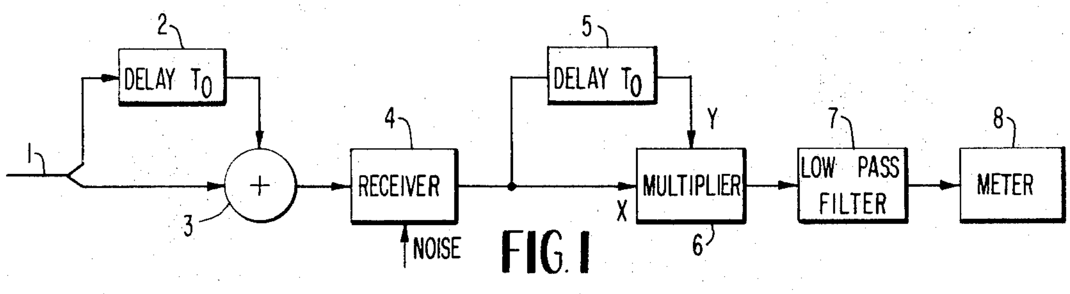
FIG. 1 is a block diagram of a radiometric receiver system according to the present invention.

FIG. 1 illustates a delay-correlation radiometer according to the present invention. An input thermal signal, assumed to be noise, with a flat power spectrum and some equivalent temperature, enters an input 1. The input signal is typically in the range of 1000 to 100,000 mHz. Immediately upon entering input 1, the input thermal signal is divided into two equal components one of which is delayed by a time $T_0$ in delay means 2 which may be dispersive (i.e. frequency sensitive). Delay means 2 can be constructed with a length of wave guide of about 3 to 6 meters, causing a delay by increasing the transmission time.

The delayed and undelayed components are then summed by summing means 3 to prouce an output signal having superimposed the input thermal signal and a time delay version of the input thermal signal. The output signal from 3 enters the first stage of receiver 4. The receiver contains a local oscillator and mixer to reduce (or down-convert) the relevant part of the input thermal signal to a frequency band ranging from about 0 Hz. to a high of about 200 to 500 mHz. The receiver also contains amplifier stages to amplify the mixer stage output.

The receiver output is a relatively high powered signal including one component which is the amplified thermal signal, a second component which is the delayed amplified thermal signal, and a third component which is the inherent receiver thermal noise.

The latter component results from the process of down-converting and amplifying the input thermal signal. The receiver thermal noise may typically be 100 to 10,000 times greater in magnitude than the thermal signal.

The receiver output is applied to the input of delay means 5 and to one input of multiplier 6. Delay means 5 operates to delay its input signal by a time $T_0$ equal to the delay of delay means 2 and may also be used to correct any dispersive (i.e. frequency sensitive) variation of the delay caused by delay means 2. The output of delay means 5 is applied to the other input of multiplier 6.

Assuming that $s(t)$ represents the amplified thermal signal component in the receiver output, $s(t-T_0)$ represents the amplified delayed thermal signal component in the receiver output, and $n(t)$ represents the receiver thermal noise component, the $x$ and $y$ inputs to the multiplier include the following components:

$$x=s(t)+s(t-T_0)+n(t)$$
$$y=s(t-T_0)+s(t-2T_0)+n(t-T_0)$$

The output of the multiplier 6 is given by $$xy=[s(t)+s(t-T_0)+n(t)]\,[s(t-T_0)+s(t-2T_0)+n(t-T_0)]$$

$$xy=s(t)s(t-T_0)+s(t)s(t-2T_0)+s(t)n(t-T_0)+[s(t-T_0)]^2+s(t-T_0)s(t-2T_0)+s(t-T_0)n(t-T_0)+n(t)s(t-T_0)+n(t)s(t-2T_0)+n(t)n(t-T_0)$$

Of the terms of the latter equation only $[s(t-T_0)]^2$ is consistently positive if $T_0$ is adjusted to a null value of the receiver's autocorrelation function. The other terms, being thermal noise with no cross correlation between the two terms of each product, oscillate between positive and negative values at high frequencies. The curves produced by these other terms average, over a reasonably long time period, to have equal areas of positive and negative signal.

Thus, when the output signal from multiplier 6 is passed through low pass filter 7, which may be an integrator, all of the signal components representing terms of the $xy$ equation except $[s(t-T_0)]^2$ are averaged out to zero and the $[s-T_0)]^2$ component is averaged to a low frequency signal to operate meter 8. Instead of using the low pass filter or integrator 7, the inertia of meter 8 could be used to provide the time averaging or integration of the multiplier output.

In order for the circuit of FIG. 1 to operate to eliminate the inherent receiver thermal noise and to give an output proportional to the square of the input thermal signal, the two delays 2 and 5 must be accurately adjusted to assure the null of receiver noise. The autocorrelation function R(T) of any sharp-cutoff random noise signal, and specifically of the inherent receiver thermal noise of this system when sharply cut off, is in the form of a $$\frac{\sin x}{x}$$

curve.

Figure 2A:
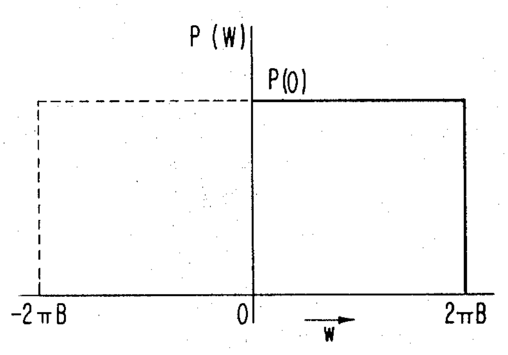
FIGS. 2A to 2F are illustrations of possible receiver transfer functions and of autocorrelation functions resulting from use of the transfer functions in the receiver system of FIG. 1.

FIG. 2A is a graph illustrating what is meant by the term "sharp cutoff." The abscissa of the graph represents frequency and the ordinate represents the power density $P(w)$ in a signal at the corresponding frequency. At a frequency of B Hz. the power density curve drops sharply to zero, indicating sharp cutoff and a bandwidth B. The mirror image frequencies, useful only for mathematical analysis, are shown along the negative abscissa. Note that if very wideband noise is applied to a receiver having a power response like $P(w)$, it too will exhibit the same cutoff properties.

Figure 2B:
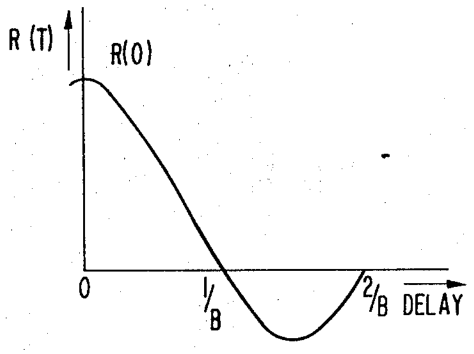

FIG. 2B is a graph of the autocorrelation function of a random noise signal as shown in FIG. 2A. Note that the first null occurs for a delay of $1/B$, that is where the signal is correlated with a version of the same signal delayed by a time equal to the reciprocal of the bandwidth. When the delay times $T_0$ used in this system are set equal to $1/B$ (assuming the receiver noise at the receiver output to be sharply cut off as in FIG. 2A), the receiver thermal noise will be nulled out and the input thermal signal will be predominant. Of course the second or later nulls of the autocorrelation function can also be used to reduce or eliminate receiver thermal noise, but this requires longer delays and more complex delay equipment.

The delay (in FIG. 2B) for which $R(T)=0$ at any null is very narrow and requires careful adjustment. The curve of FIG. 2B has a negligible region of approximately zero first derivative. It would be helpful, although not necessary, if an autocorrelation function could be used which has a broad null. This would make adjustment easier.

Figure 2C:
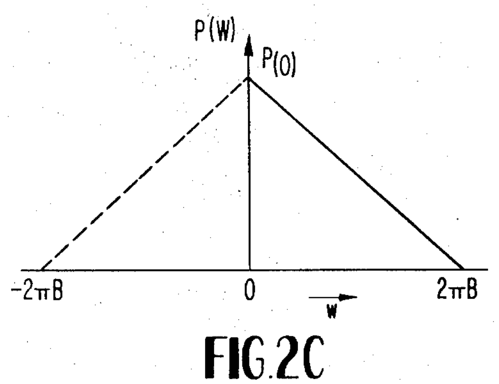
Figure 2D:
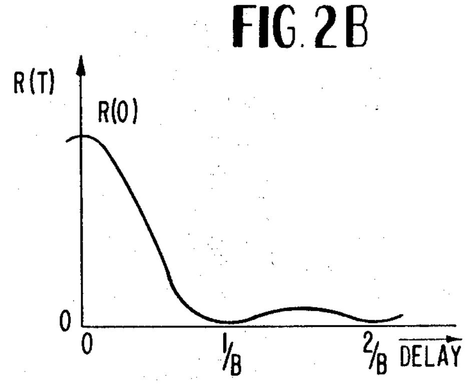

It is possible to adjust the transfer function (or power response) of the receiver to have a larger region in which the autocorrelation is approximately zero by selecting a transfer function which makes derivatives of the autocorrelation function zero at the null. FIG. 2C shows the signal $P(w)$ passing from a receiver with a triangular receiver transfer function. The triangular transfer function causes the autocorrelation function $R(T)$ to be as illustrated in FIG. 2D. Note that the $R(T)$ curve is nearly flat over a large region of delay near $1/B$.

Figure 2E:
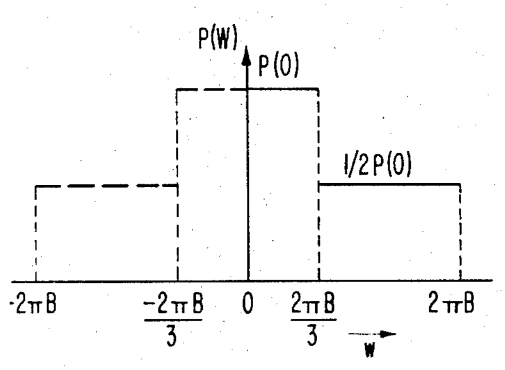
Figure 2F:
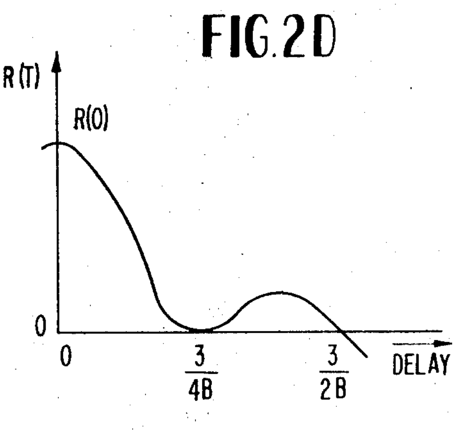

FIG. 2E shows the signal $P(w)$ passing from a receiver with a stepped receiver transfer function. The stepped transfer function causes an autocorrelation function $R(T)$ as illustrated in FIG. 2F. Note that the $R(T)$ curve is nearly flat over a large region of delay near $3/4B$. This autocorrelation function has the added advantage that the null delay $3/4B$ is shorter than the delay $1/B$ required for the previous two transfer functions (i.e. sharp cutoff and triangular).

Other receiver transfer functions are also useable. Filter systems in the receiver or at the output of the receiver can be used to provide the desired transfer functions. By using such transfer functions it is possible to construct a system based on FIG. 1 in which the delays of elements 2 and 5 need not be exactly equal for acceptable operation.

Many more examples of the application of the present invention will suggest themselves to those skilled in the art. Alternative methods of accomplishing the inventions may suggest themselves to those skilled in the art. Accordingly, the scope of the present application is only limited to the extent of the claims which follow.

What is claimed is:

1. A radiometer system for detecting a thermal signal in the presence of receiver thermal noise, comprising (a) means responsive to an input thermal signal for generating a combined signal, said combined signal comprising superimposed first and second signal, components, said first and second signal components each being proportional to said input thermal signal, said second signal component being delayed with respect to said first signal component by predetermined amount of time, (b) a receiver, including amplifier means, characterized by the generation of inherent internal thermal noise and responsive to said combined signal for generating a receiver output signal, (c) means for producing a delayed receiver output signal proportional to said receiver output signal and delayed with respect to said receiver output signal by said predetermined amount of time, and (d) means responsive to said receiver output signal and to said delayed receiver output signal for producing a system output signal having a thermal signal to thermal noise ratio which is much geater in said system output signal than in said receiver output signal.

2. A radiometer system according to claim 1 wherein said means responsive to an input thermal signal for generating a combined signal further comprises (a) means for receiving said input thermal signal, (b) means for dividing said input thermal signal into two components, one of said two components being said first signal component, (c) means for delaying the other of said two components to produce said second signal component, and (d) signal summing means for combining said first and second signal components to produce said combined signal.

3. A radiometer system according to claim 2 wherein said means responsive to said receiver output signal and to said delayed receiver output signal for producing a system output signal further comprises (a) multiplier means responsive to said receiver output signal and to said delayed receiver output signal for producing a multiplier output signal proportional to the product of the mutiplier input signals, and (b) low-pass filter means responsive to said multiplier output signal for producing said system output signal.

4. A radiometer system according to claim 1 wherein said means responsive to said receiver output signal and to said delayed receiver output signal for producing a system output signal further comprises (a) multiplier means responsive to said receiver output signal for producing a multiplied output signal proportional to the product of the multiplier input signals, and (b) low-pas filter means responsive to said multiplier output signal for producing said system output signal.

5. A radiometer system according to claim 3 wherein said low-pass filter means comprises an integrator.

6. A radiometer system according to claim 1 wherein (a) said means responsive to said receiver output signal and to said delayed receiver output signal is a correlation means for generating an autocorrelation signal from said receiver output signal, and (b) said predetermined amount of time equals the time delay required to null said inherent internal noise from said autocorrelation signal.

References Cited

UNITED STATES PATENTS

| | | | |
|---|---|---|---|
| 3,017,505 | 1/1962 | Clapp | 325—363 X |
| 3,056,958 | 10/1962 | Anderson | 250—83.3 X |
| 3,235,731 | 2/1966 | Seling | 250—83.3 |
| 3,337,870 | 8/1967 | Allen et al. | 325—475 UX |

ROBERT L. GRIFFIN, Primary Examiner

R. S. BELL, Assistant Examiner

U.S. Cl. X.R.

250—83.3; 325—473